United States Patent
Walsh et al.

(10) Patent No.: US 10,545,757 B2
(45) Date of Patent: Jan. 28, 2020

(54) INSTRUCTION FOR DETERMINING EQUALITY OF ALL PACKED DATA ELEMENTS IN A SOURCE OPERAND

(71) Applicant: Intel Corporation, Santa Clara, CA (US)

(72) Inventors: Matt Walsh, San Carlos, CA (US); Elmoustapha Ould-Ahmed-Vall, Chandler, AZ (US); Robert Valentine, Kiryat Tivon (IL); Bret Toll, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1095 days.

(21) Appl. No.: 13/730,752

(22) Filed: Dec. 28, 2012

(65) Prior Publication Data

US 2014/0189294 A1    Jul. 3, 2014

(51) Int. Cl.
*G06F 9/30* (2018.01)

(52) U.S. Cl.
CPC ...... *G06F 9/30021* (2013.01); *G06F 9/30036* (2013.01)

(58) Field of Classification Search
CPC .................. G06F 9/30021; G06F 9/30036
See application file for complete search history.

(56) References Cited

U.S. PATENT DOCUMENTS

| | | | | |
|---|---|---|---|---|
| 3,700,873 A * | 10/1972 | Yhap | ........................ | G06F 9/22 708/100 |
| 5,835,782 A * | 11/1998 | Lin | ........................ | G06F 7/505 708/490 |
| 2006/0190700 A1* | 8/2006 | Altman | ............... | G06F 11/1641 712/7 |
| 2009/0249026 A1* | 10/2009 | Smelyanskiy | ...... | G06F 9/30032 712/4 |
| 2012/0239911 A1* | 9/2012 | Gonion | ..................... | G06F 8/41 712/222 |
| 2014/0181466 A1* | 6/2014 | Forsyth | ............... | G06F 9/30145 712/7 |
| 2014/0258683 A1* | 9/2014 | Ould-Ahmed-Vall | ...................... | G06F 9/30145 712/208 |
| 2014/0351567 A1* | 11/2014 | Plotnikov | ........... | G06F 9/30018 712/225 |

OTHER PUBLICATIONS

ARM, "ARM Compiler Toolchain, Version 5.0, Assembler Reference", 2010-11, p. 4-19.*
IXE Electronics, "Copperhead® Architecture Instruction Set Reference Manual", Jul. 13, 2011, pp. 1-37.*

* cited by examiner

*Primary Examiner* — David J. Huisman
(74) *Attorney, Agent, or Firm* — Nicholson De Vos Webster & Elliott LLP

(57) ABSTRACT

Systems, apparatuses, and methods for performing an instruction in a computer processor are described. For example, an instruction having a source and destination operand is executed to determine whether all data elements of the source operand are equal and an indication of the determination is stored in the destination operand.

18 Claims, 20 Drawing Sheets

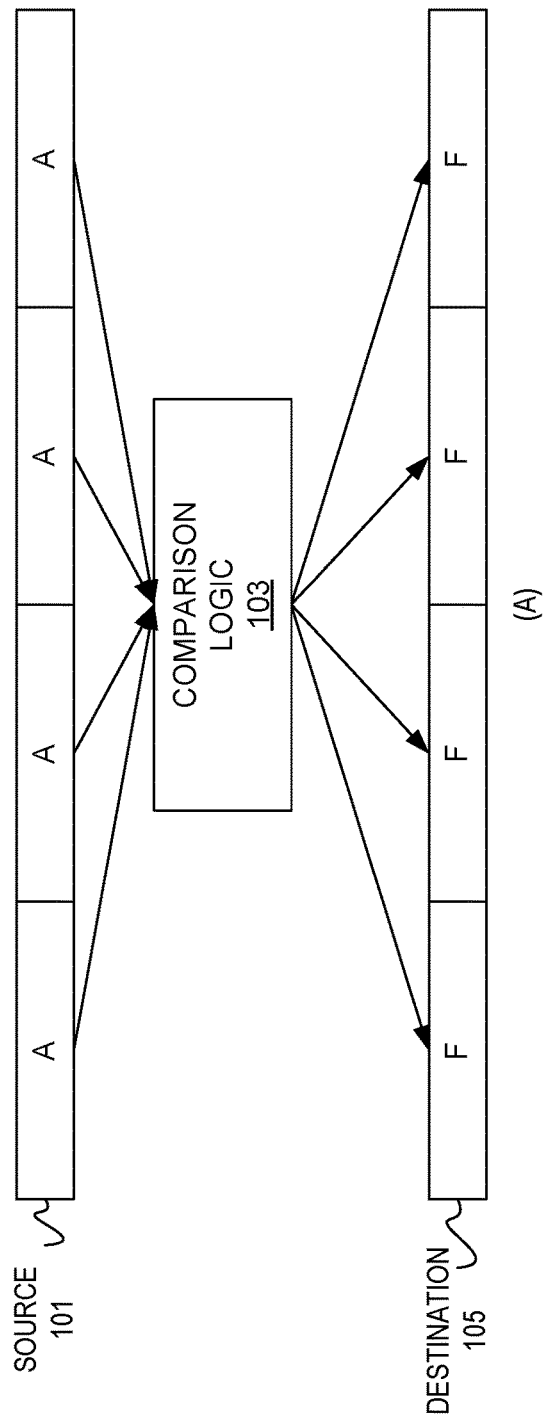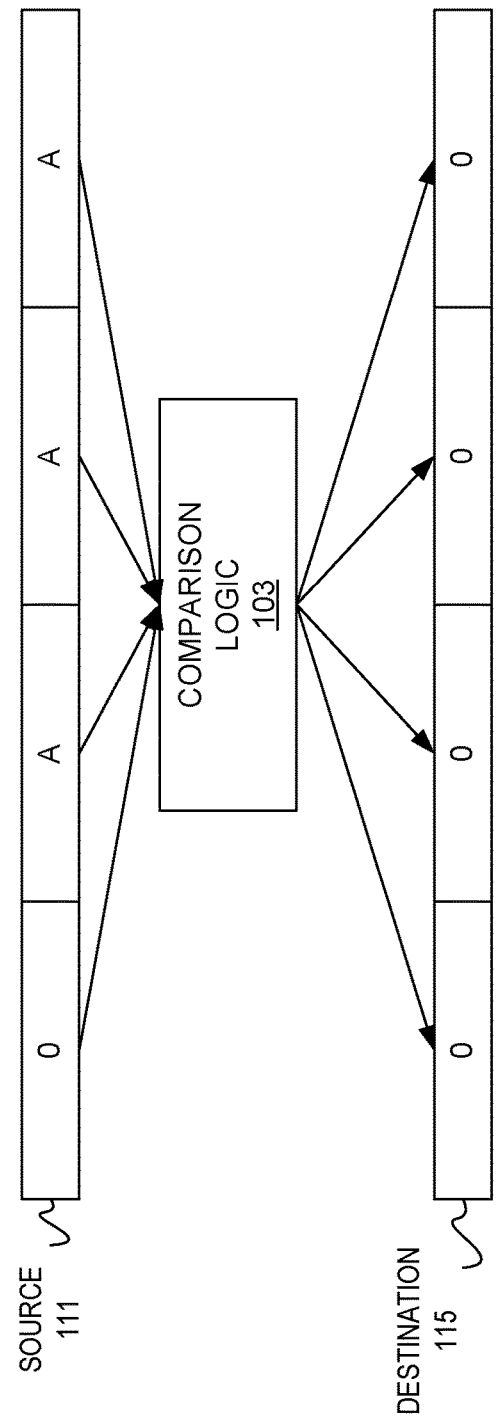
FIG. 1

VPISUNIFORMD: RETURN ALL 1'S IF VALUES OF ALL ELEMENTS IN THE SOURCE ARE EQUAL

FOR k =1 to VECT_LENGTH-1
// VECT_LENGTH is 4 for 128-bit, 8 for 256-bit
i = 32*k
DEST = 0xFF...F
IF SRC[i+31:i] != SRC[31:0]
    THEN DEST = 0x00...0 (and exit for loop)

FIG. 5

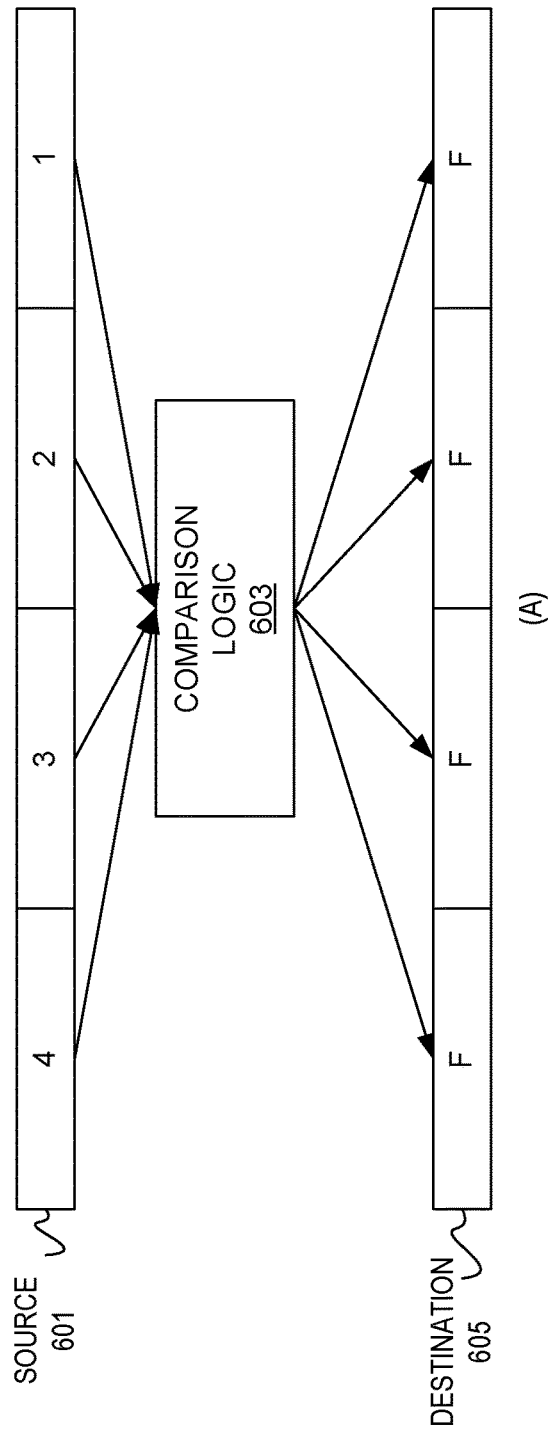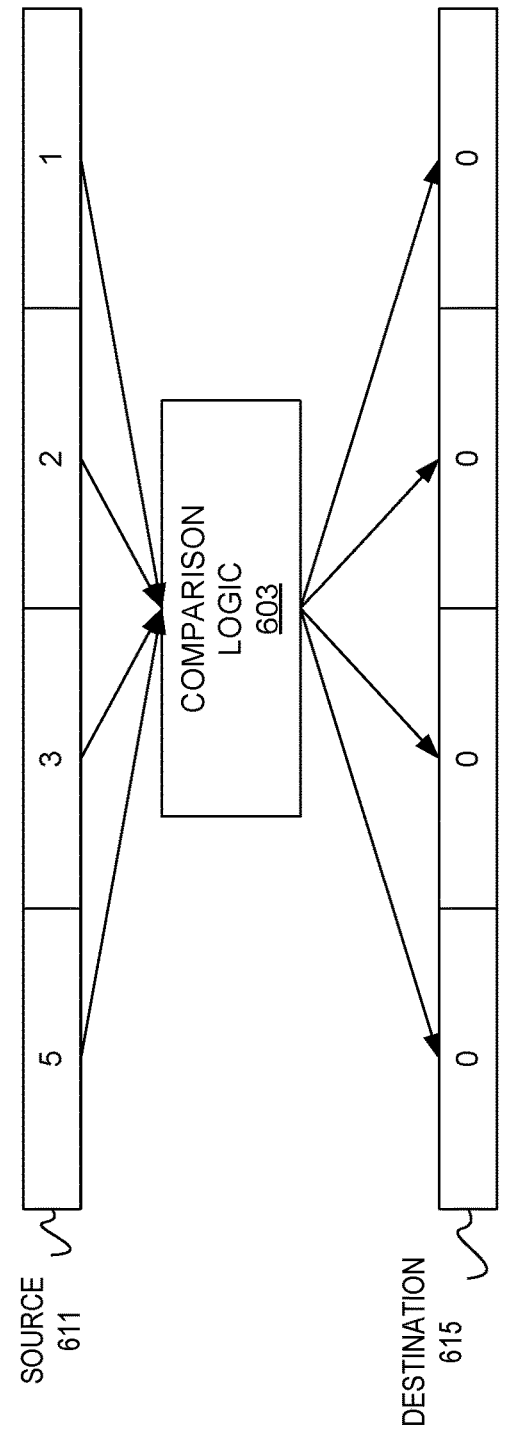
FIG. 6

VPISSEQUENTIAL: RETURN ALL 1'S IF VALUES OF ALL ELEMENTS IN THE SOURCE ARE SEQUENTIAL

```
FOR k =1 to VECT_LENGTH-1
// VECT_LENGTH is 4 for 128-bit, 8 for 256-bit
i = 32*k
DEST = 0xFF...F
IF SRC[i+31:i] != SRC[31:0] + k
        THEN DEST = 0x00...0 (and exit for loop)
```

FIG. 10

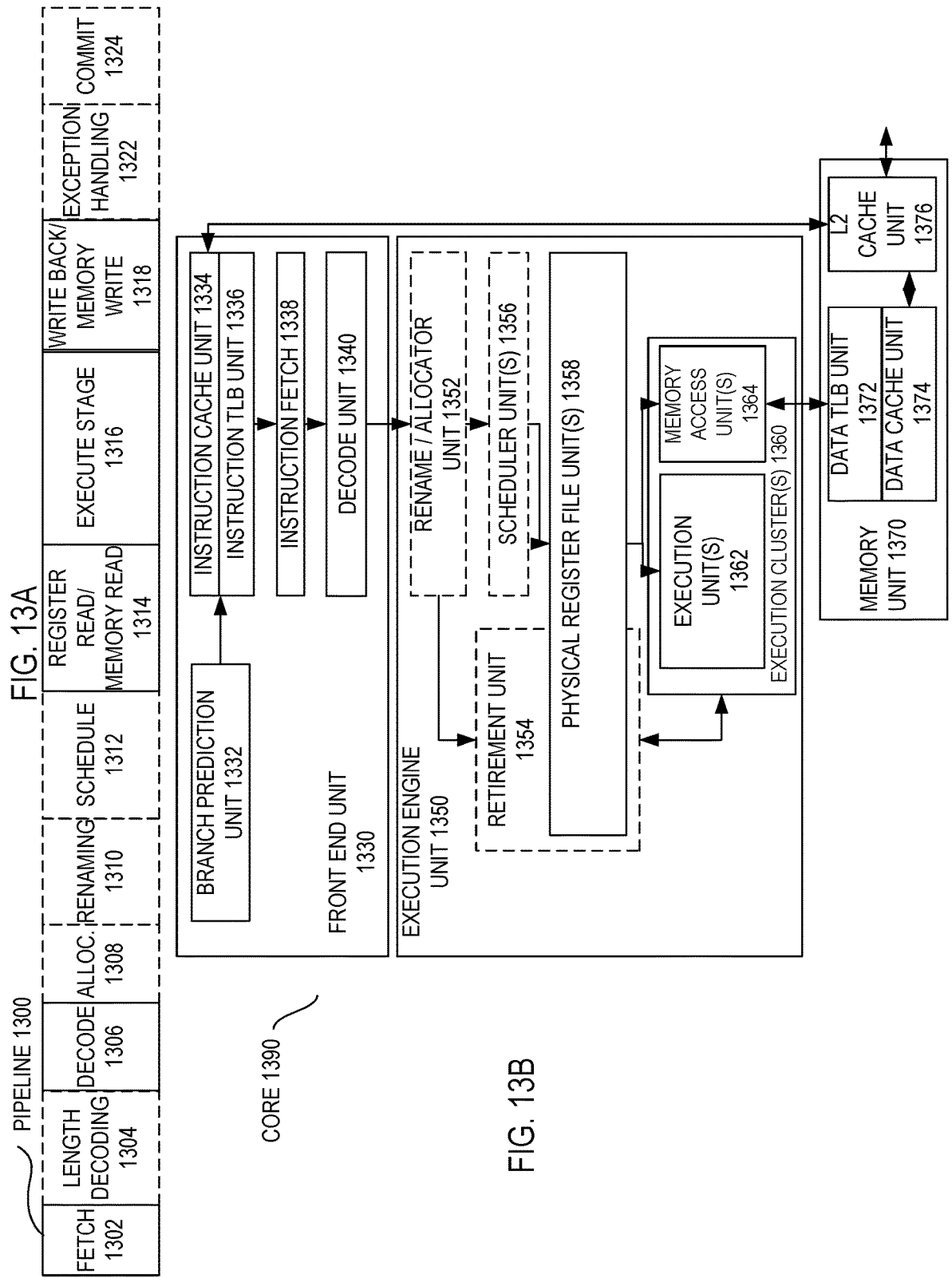

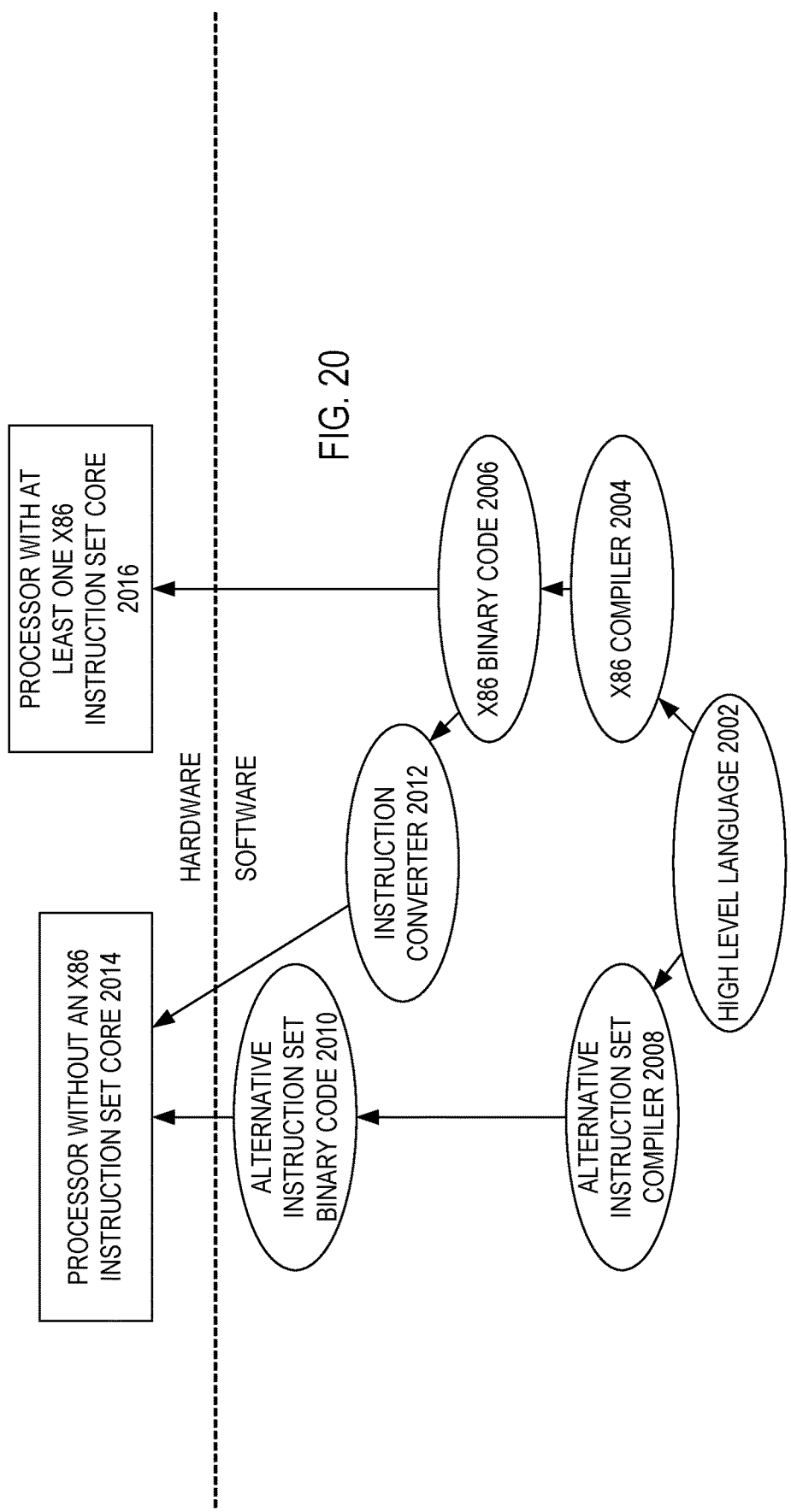

10,545,757 B2

INSTRUCTION FOR DETERMINING EQUALITY OF ALL PACKED DATA ELEMENTS IN A SOURCE OPERAND

FIELD OF INVENTION

The field of invention relates generally to computer processor architecture, and, more specifically, to instructions which when executed cause a particular result.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). It should be noted that the term instruction generally refers herein to a macro-instruction—that is instructions that are provided to the processor for execution—as opposed to micro-instructions or micro-ops—that result from a processor's decoder decoding macro-instructions.

BRIEF DESCRIPTION OF THE DRAWINGS

The present invention is illustrated by way of example and not limitation in the figures of the accompanying drawings, in which like references indicate similar elements and in which:

FIG. 1 illustrates an exemplary illustration of an operation of VPISUNIFORMD.

FIG. 5 illustrates exemplary pseudo code for VPISUNIFORMD.

FIG. 6 illustrates an exemplary illustration of an operation of VPISSEQUENTIAL.

FIG. 10 illustrates exemplary pseudo code for VPISSEQUENTIAL.

FIG. 13A is a block diagram illustrating both an exemplary in-order pipeline and an exemplary register renaming, out-of-order issue/execution pipeline according to embodiments of the invention.

FIG. 13B is a block diagram illustrating both an exemplary embodiment of an in-order architecture core and an exemplary register renaming, out-of-order issue/execution architecture core to be included in a processor according to embodiments of the invention.

FIG. 20 is a block diagram contrasting the use of a software instruction converter to convert binary instructions in a source instruction set to binary instructions in a target instruction set according to embodiments of the invention.

DETAILED DESCRIPTION

Figure 2:
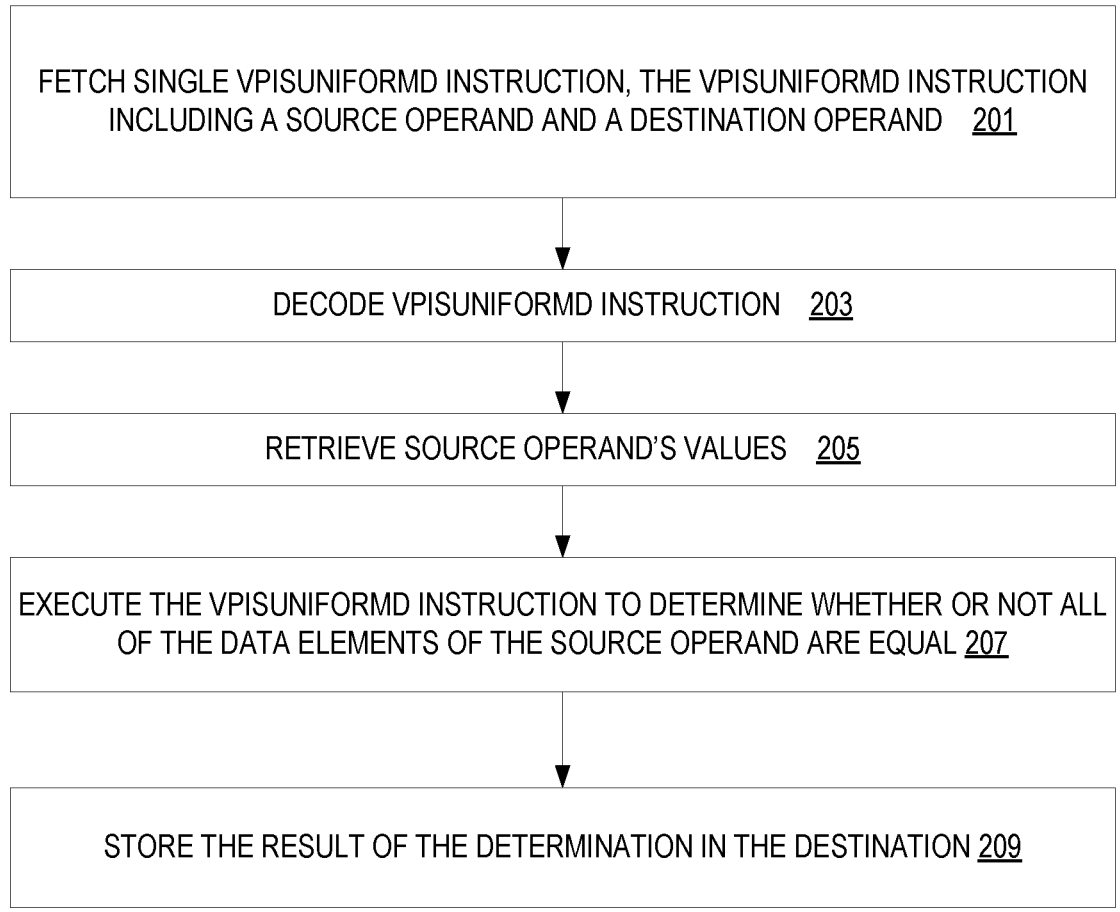
FIG. 2 illustrates an embodiment of the execution of a VPISUNIFORMD instruction in a processor.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

The instruction set architecture is distinguished from the microarchitecture, which is the internal design of the processor implementing the ISA. Processors with different microarchitectures can share a common instruction set. For example, Intel Pentium 4 processors, Intel Core processors, and Advanced Micro Devices, Inc. of Sunnyvale Calif. processors implement nearly identical versions of the x86 instruction set (with some extensions having been added to newer versions), but have different internal designs. For example, the same register architecture of the ISA may be implemented in different ways in different micro-architectures using well known techniques, including dedicated physical registers, one or more dynamically allocated physical registers using a register renaming mechanism (e.g., the use of a Register Alias Table (RAT), a Reorder Buffer (ROB) and a retirement register file as described in U.S. Pat. No. 5,446,912; the use of multiple maps and a pool of registers as described in U.S. Pat. No. 5,207,132), etc. Unless otherwise specified, the phrases register architecture, register file, and register refer to that which is visible to the software/programmer and the manner in which instructions specify registers. Where specificity is desired, the adjective logical, architectural, or software visible will be used to indicate registers/files in the register architecture, while different adjectives will be used to designate registers in a given micro-architecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. A given instruction is expressed using a given instruction format and specifies the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 64-bit register may be specified as a source operand to be operated on as four separate 16-bit data elements, each of which represents a separate 16-bit value. As another example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that have only one or has more than two source vector operands; that operate in a horizontal fashion; that generate a result vector operand that is of a different size, that have a different size of data elements, and/or that have a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction.

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance (Core™ and MMX™ are registered trademarks or trademarks of Intel Corporation of Santa Clara, Calif.). An additional set of SIMD extensions, referred to the Advanced Vector Extensions (AVX) (AVX1 and AVX2) and using the VEX coding scheme, has been released and/or published (e.g., see Intel® 64 and IA-32 Architectures Software Developers Manual, October 2011; and see Intel® Advanced Vector Extensions Programming Reference, June 2011).

In the description below, there are some items that may need explanation prior to describing the operations of this particular instruction in the instruction set architecture. One such item is called a "writemask register" which is generally used to predicate an operand to conditionally control per-element computational operation (below, the term mask register may also be used and it refers to a writemask register such as the "k" registers discussed below). As used below, a writemask register stores a plurality of bits (16, 32, 64, etc.) wherein each active bit of the writemask register governs the operation/update of a packed data element of a vector register during SIMD processing. Typically, there is more than one writemask register available for use by a processor core.

The instruction set architecture includes at least some SIMD instructions that specify vector operations and that have fields to select source registers and/or destination registers from these vector registers (an exemplary SIMD instruction may specify a vector operation to be performed on the contents of one or more of the vector registers, and the result of that vector operation to be stored in one of the vector registers). Different embodiments of the invention may have different sized vector registers and support more/less/different sized data elements.

The size of the multi-bit data elements specified by a SIMD instruction (e.g., byte, word, double word, quad word) determines the bit locations of the "data element positions" within a vector register, and the size of the vector operand determines the number of data elements. A packed data element refers to the data stored in a particular position. In other words, depending on the size of the data elements in the destination operand and the size of the destination operand (the total number of bits in the destination operand) (or put another way, depending on the size of the destination operand and the number of data elements within the destination operand), the bit locations of the multi-bit data element positions within the resulting vector operand change (e.g., if the destination for the resulting vector operand is a vector register (in this discussion vector registers and packed data element registers are used interchangeably), then the bit locations of the multi-bit data element positions within the destination vector register change). For example, the bit locations of the multi-bit data elements are different between a vector operation that operates on 32-bit data elements (data element position 0 occupies bit locations 31:0, data element position 1 occupies bit locations 63:32, and so on) and a vector operation that operates on 64-bit data elements (data element position 0 occupies bit locations 63:0, data element position 1 occupies bit locations 127:64, and so on).

Figure 11:
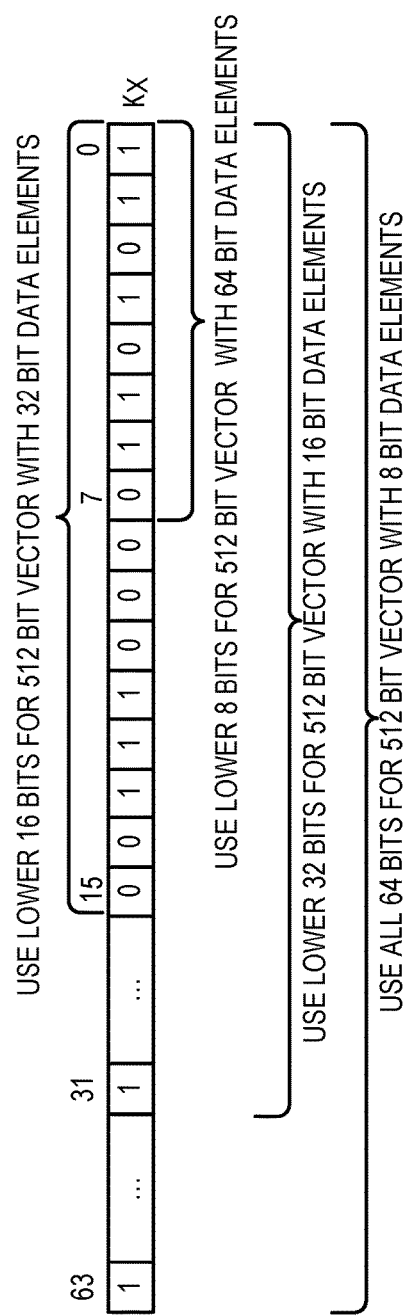
FIG. 11 illustrates a correlation between the number of one active bit vector writemask elements and the vector size and the data element size according to one embodiment of the invention.

Additionally, there is a correlation between the number of one active bit vector writemask elements and the vector size and the data element size according to one embodiment of the invention as shown in FIG. 11. Vector sizes of 128-bits, 256-bits, and 512-bits are shown, although other widths are also possible. Data element sizes of 8-bit bytes (B), 16-bit words (W), 32-bit doublewords (D) or single precision floating point, and 64-bit quadwords (Q) or double precision floating point are considered, although other widths are also possible. As shown, when the vector size is 128-bits, 16-bits may be used for masking when the vector's data element size is 8-bits, 8-bits may be used for masking when the vector's data element size is 16-bits, 4-bits may be used for masking when the vector's data element size is 32-bits, and 2-bits may be used for masking when the vector's data element size is 64-bits. When the vector size is 256-bits, 32-bits may be used for masking when the packed data element width is 8-bits, 16-bits may be used for masking when the vector's data element size is 16-bits, 8-bits may be used for masking when the vector's data element size is 32-bits, and 4-bits may be used for masking when the vector's data element size is 64-bits. When the vector size is 512-bits, 64-bits may be used for masking when the vector's data element size is 8-bits, 32-bits may be used for masking when the vector's data element size is 16-bits, 16-bits may be used for masking when the vector's data element size is 32-bits, and 8-bits may be used for masking when the vector's data element size is 64-bits.

Depending upon the combination of the vector size and the data element size, either all 64-bits, or only a subset of the 64-bits, may be used as a write mask. Generally, when a single, per-element masking control bit is used, the number of bits in the vector writemask register used for masking (active bits) is equal to the vector size in bits divided by the vector's data element size in bits.

As noted above, writemask registers contain mask bits that correspond to elements in a vector register (or memory location) and track the elements upon which operations should be performed. For this reason, it is desirable to have common operations which replicate similar behavior on these mask bits as for the vector registers and in general allow one to adjust these mask bits within the writemask registers.

Described below is "Runtime Gather Bypass" (RGB) for the case where the same index value is used in all the lanes. In many, perhaps most, cases, memory access bottlenecks CPU/GPU performance. But among memory access problems, scatter/gather access patterns, when the processor must sequentially load/store data from/to non-sequential memory locations, make an already bad situation worse. Even with specialized hardware to assist gather/scatter, it simply is significantly faster and more power efficient to load/store sequential data.

At least 3 strategies can mitigate scatter/gather costs. 1) Do static compilation analysis and replace groups of gather/scatter loads with a vector load/store instruction. This works only in limited cases when the program's execution flow can be fully characterized and proven to always produce correct results. For example, four MOVD instructions to 4 sequential, properly-aligned locations might become one MOVAPS. 2) Use scatter/gather acceleration hardware. 3) "RGB"—produce code for both generalized scatter gather and simple loads at compile time and dynamically check program state and execute the simple load path if possible. The instructions detailed herein accelerate the dynamic check part of RGB, however, the instructions detailed below may be used for other purposes.

Consider the case where doublewords are gathered in an XMM register. For the dword case, executing this instruction on this register:

| lane 0 | lane 1 | lane 2 | lane 3 |
| 0-31 | 32-63 | 64-95 | 96-127 | would produce a result of:

TRUE when if (lane 1==(lane 0)+1) && (lane 2==(lane 0)+2) && (lane 3==(lane 0)+3) is true, or FALSE otherwise. Without this instruction, this check may require 3 (scalar) comparisons and as many Below are embodiments of an instruction generically called a vector packed test conflicts ("VPISUNIFORMD") instruction of the instruction set and embodiments of systems, architectures, instruction formats, etc. that may be used to execute such an instruction. The execution of a VPISUNIFORMD causes a comparison of two or more data elements of a source (register or memory) location to determine if each of the compared data elements is the same and to store an indication of whether or not the compared data elements are the same into a destination (register or memory) location. In some embodiments, all of the data elements of the source are compared and in other embodiments only a subset of the data elements of the source are compared. When only a subset is to be compared, the subset may be determined through the use of a writemask register. Note also that a possible extension is to provide instructions that can be used to do the check and jump in one instruction: JUNIF and JNUNIF. Each of these two instructions takes as a source a vector of indexes and checks for whether uniform or not and jumps depending on the result.

FIG. 1 illustrates an exemplary illustration of an operation of VPISUNIFORMD. In the illustrated example 1(A), data elements from a source register 101 are compared against each other using comparison logic 103 to determine if the contents of each data element are the same. In some embodiments, this comparison is an ANDing of the data elements of the source register 101.

The result of the comparison is stored in the destination register 105. In this example, all of the data elements have a hex value of "A" and are thus the same. The output from the comparison logic is an "F" value (all 1s) which is stored in each data element position of the destination 105. Of course, variations of what is to be stored may be utilized such as using all 0s when the result is true, a single bit placed in one or more of the data elements (such as setting the least significant bit in each data element to 1 or 0), etc. Additionally, the source and destination registers 101, 105 do not have to be a register and could be any other storage entity such as a memory location.

In the illustrated example 1(B), data elements from a source register 111 are compared against each other using comparison logic 113 to determine if the contents of each data element are the same. In some embodiments, this comparison is an ANDing of the data elements of the source register 111.

The result of the comparison is stored in the destination register 115. In this example, all of the data elements have a hex value of "A" except for the most significant which is a "0." The output from the comparison logic is a "0" value (all 0s) which is stored in each data element position of the destination 115. Of course, variations of what is to be stored may be utilized such as using all 1s when the result is false, a single bit placed in one or more of the data elements (such as setting the least significant bit in each data element to 1 or 0), etc. As with FIG. 1(A), the source and destination registers 111, 115 do not have to be a register and could be any other storage entity such as a memory location.

Exemplary Format of VPISUNIFORMD

An exemplary format of this instruction is "VPISUNIFORMD {K1} R1, R2" where the destination operand K1 is an optional writemask register, R1 is a packed data source register, and R2 is a packed data destination register (such as 128-, 256-, 512-bit register, etc.) and VPISUNIFORMD is the instruction's opcode. As noted earlier, the instruction will also work with memory locations, not just registers. Additionally, in some embodiments the destination is a general purpose register.

Exemplary Methods of Execution of VPISUNIFORMD

FIG. 2 illustrates an embodiment of the execution of a VPISUNIFORMD instruction in a processor. A VPISUNIFORMD instruction with a source operand, a destination operand, and an opcode is fetched at 201.

The VPISUNIFORMD instruction is decoded by decoding logic at 203. Depending on the instruction's format, a variety of data may be interpreted at this stage such as if there is to be a data transformation, which registers to write to and/or retrieve, what memory address to access, etc.

The source operand values are retrieved/read at 205. For example, the source vector register is read. If the source operand is a memory operand, then the data elements associated with that operand is retrieved. In some embodiments, data elements from memory are stored into a temporary register.

The VPISUNIFORMD instruction (or operations comprising such an instruction such as microoperations) is executed by execution resources such as one or more functional units at 207 to determine whether or not all of the data elements of the source operand are equal. As noted early, this determination may be made by ANDing all of the data elements of the source operand.

An indication of the result of the determination is stored in a destination location at 209. As noted above, in some embodiments, each data element position of the destination location has the indication stored. For example, all 1s may be written in each data element position of the destination if the determination is true or all 0s if false. While 207 and 209 have been illustrated separately, in some embodiments they are performed together as a part of the execution of the instruction.

Figure 3:
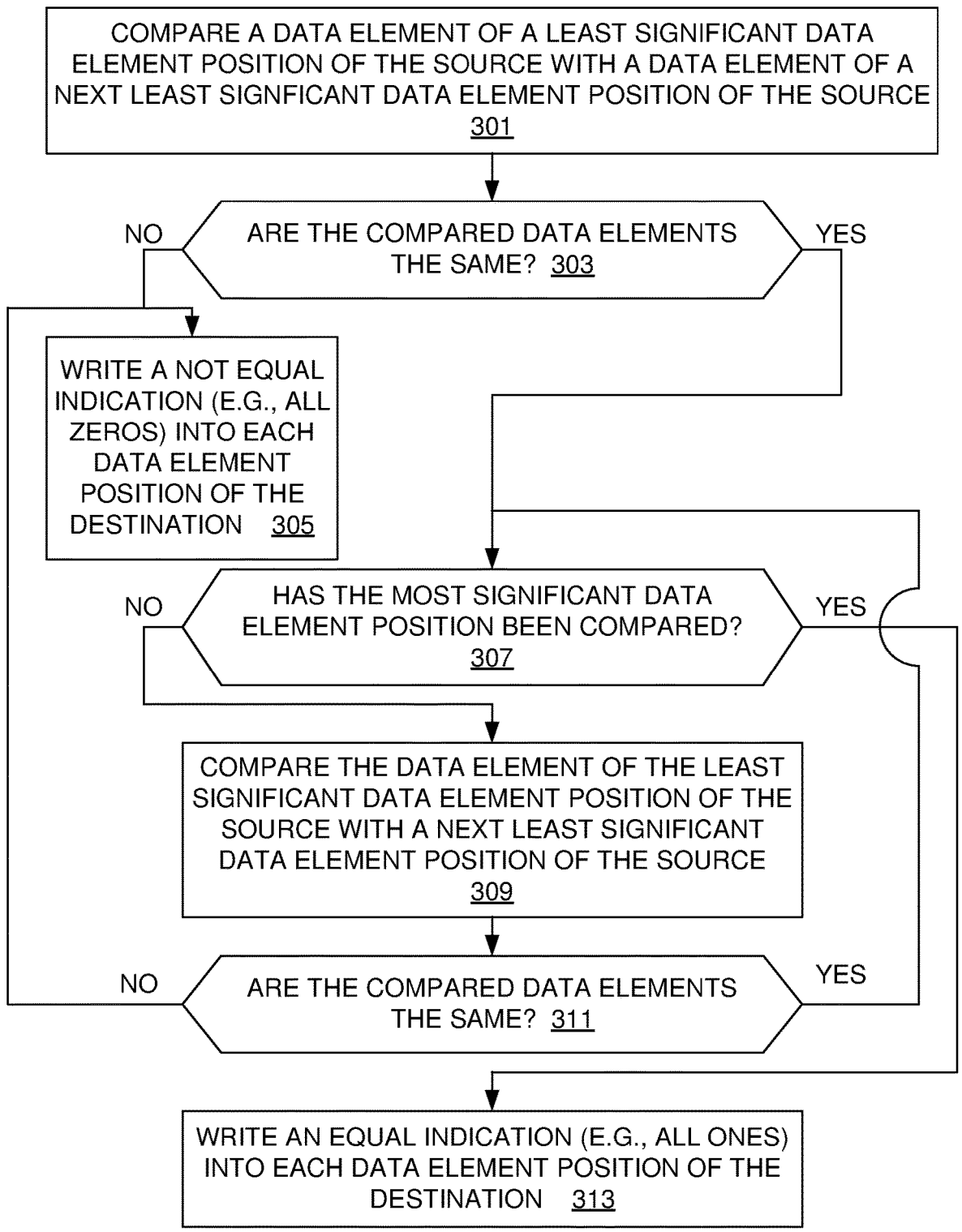
FIG. 3 illustrates an embodiment of a method for processing a VPISUNIFORMD instruction.

FIG. 3 illustrates an embodiment of a method for processing a VPISUNIFORMD instruction. In this embodiment it is assumed that some, if not all, of the operations 201-205 have been performed earlier, however, they are not shown in order to not obscure the details presented below. For example, the fetching and decoding are not shown, nor is the operand retrieval shown.

At 301, a data element of a least significant data element position of the source is compared to a data element from a data element position that is next least significant. For example, a data element of data element position 0 (the least significant data element position) is compared to a data element of data element position 1 (the next least significant data element position).

A determination of if the compared data elements are the same is made at 303. If not, then an indication of this is written into each data element position of the destination at 305. For example, all 0s are written into each data element position of the destination.

If yes, then a determination may be made at 307 of if the most significant data element position of the source has been subject to a comparison is made. This step may not be performed after the two most least significant data element positions have been compared.

If this step is not performed, or if the determination is a no, then the least significant data element position of the source is compared to a data element from a data element position that is subsequently next least significant at 309. For example, a data element of data element position 0 (the least significant data element position) is compared to a data element of data element position 2 (the subsequently next least significant data element position). Of course, data element positions 1 and 2 could have been compared too and as such there are many variations that may be used in this comparison.

After the comparison 309, a determination is made at 311 of if the compared data elements are the same is made. If the data elements are not the same, then an indication of this is written into each data element position of the destination. For example, all 0s are written into each data element position of the destination at 305. If the data elements are the same, then the determination of 307 is performed.

After the most significant data element position has been compared and was found to be the same as what is was compared to, then an "equal" indication (e.g., all 1s) is written into each data element position of the destination at 313.

While the above as been described as starting with the least significant data element position, any variant of the order may be used as long as all data element positions are compared to the other data element positions of the source. Typically, the same data element position will be compared against all of the others such as what was detailed above, however that does not need to be the case.

Figure 4:
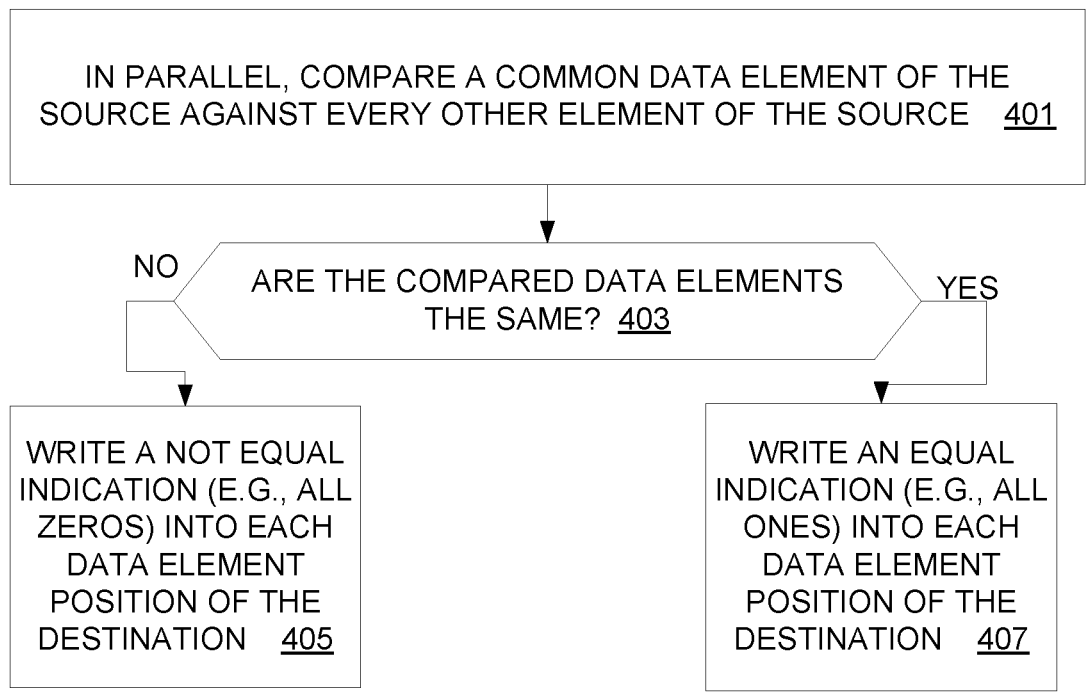
FIG. 4 illustrates an exemplary process for a broadcast.

FIG. 4 illustrates an embodiment of a method for processing a VPISUNIFORMD instruction. In this embodiment it is assumed that some, if not all, of the operations 201-205 have been performed earlier, however, they are not shown in order to not obscure the details presented below. For example, the fetching and decoding are not shown, nor is the operand retrieval shown.

At 401, each data element of the source is compared to a common data element of the source in parallel (aside for comparing against itself). For example, data element positions 1-3 are all compared, in parallel, to data element position 0.

A determination of if all of the compared data elements are the same is made at 403. If not, then an indication of this is written into each data element position of the destination at 405. For example, all 0s are written into each data element position of the destination. If yes, then an indication of this is written into each data element position of the destination at 407. For example, all 1s are written into each data element position of the destination.

FIG. 5 illustrates exemplary pseudo code for VPISUNIFORMD.

Below are embodiments of an instruction generically called a vector packed test conflicts ("VPISSEQUENTIAL") instruction of the instruction set and embodiments of systems, architectures, instruction formats, etc. that may be used to execute such an instruction that is beneficial in several different. The execution of a VPISSEQUENTIAL instruction causes a comparison of two or more data elements of a source (register or memory) location to determine if each subsequent data element of the compared data elements is one value larger than the previous data element and to store an indication of whether or not the compared data elements are sequential (one larger) into a destination (register or memory) location. In some embodiments, all of the data elements of the source are compared and in other embodiments only a subset of the data elements of the source are compared. When only a subset is to be compared, the subset may be determined through the use of a writemask register. Note also that a possible extension to this idea is to provide instructions that can be used to do the check and jump in one instruction: JSEQ and JNSEQ. Each of these two instructions takes as a source a vector of indexes and checks for whether uniform or not and jumps depending on the result.

FIG. 6 illustrates an exemplary illustration of an operation of VPISSEQUENTIAL. In the illustrated example 6(A), data elements from a source register 601 are compared against each other using comparison logic 603 to determine if the contents of the data element positions are sequential.

The result of the comparison is stored in the destination register 605. In this example, all of the data elements of the data element positions have values that start at 1 and sequentially go to 4. The output from the comparison logic is an "F" value (all 1s) which is stored in each data element position of the destination 605. Of course, variations of what is to be stored may be utilized such as using all 0s when the result is true, a single bit placed in one or more of the data elements (such as setting the least significant bit in each data element to 1 or 0), etc. Additionally, the source and destination registers 601, 605 do not have to be a register and could be any other storage entity such as a memory location.

In the illustrated example 6(B), data elements from a source register 611 are compared against each other using comparison logic 613 to determine if the contents of the data element positions are sequential.

The result of the comparison is stored in the destination register 615. In this example, all of the data elements of are not sequential (the values 1, 2, 3, and then 5). The output from the comparison logic is a "0" value (all 0s) which is stored in each data element position of the destination 615. Of course, variations of what is to be stored may be utilized such as using all 1s when the result is false, a single bit placed in one or more of the data elements (such as setting the least significant bit in each data element to 1 or 0), etc. As with FIG. 6(A), the source and destination registers 611, 615 do not have to be a register and could be any other storage entity such as a memory location.

Figure 7:
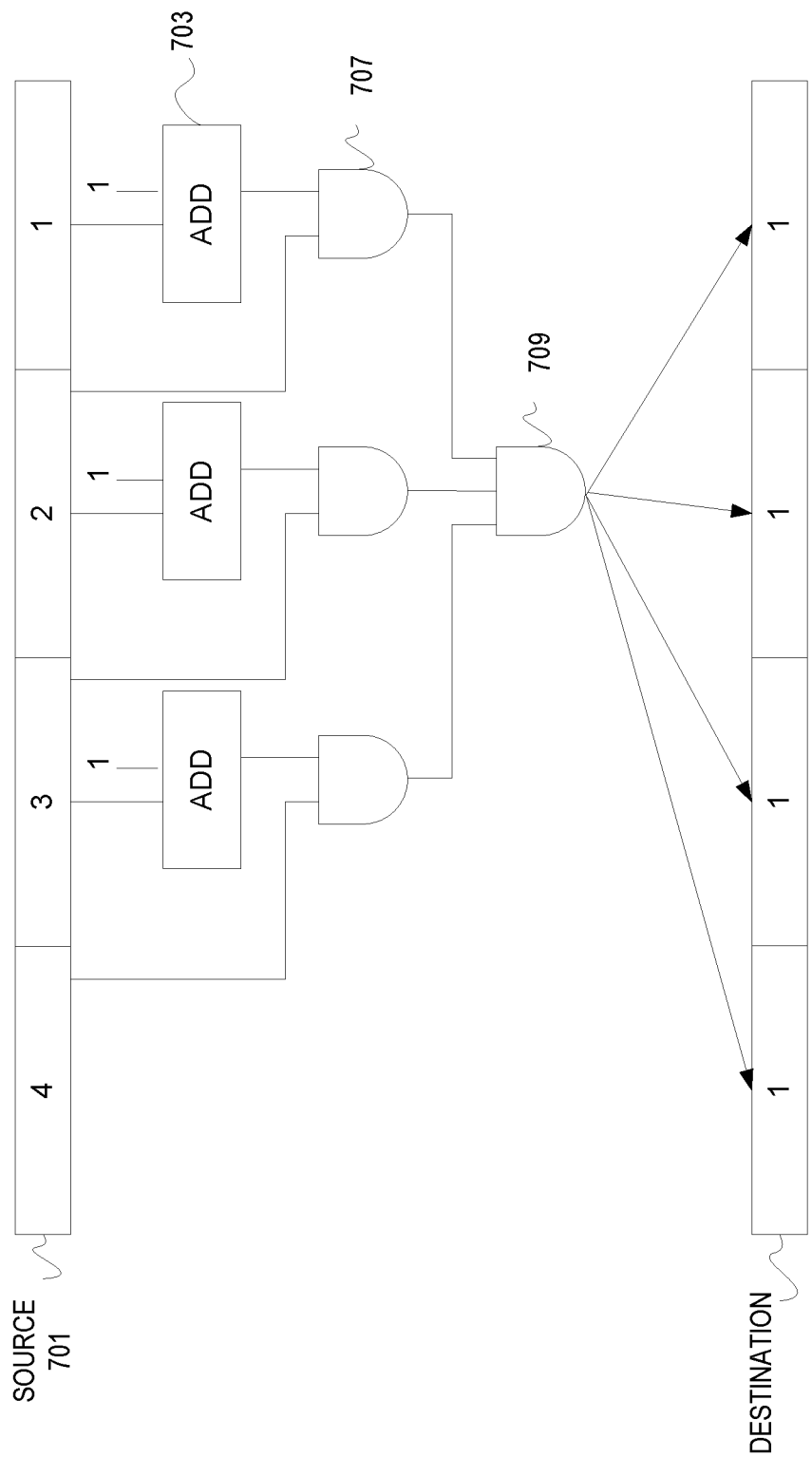
FIG. 7 illustrates exemplary illustration of an operation of VPISSEQUENTIAL.

FIG. 7 illustrates exemplary illustration of an operation of VPISSEQUENTIAL. In the illustrated example, data elements from a source register 701 are compared against each other using comparison logic to determine if the contents of the data element positions are sequential. In this example, the comparison logic includes addition logic 703 and AND gates 707 and 709. For all data element positions, but for the most significant, a "1" value is added to the content of each data element position using the addition logic 703. The output of each addition is ANDed with the content of the data element position that is immediate more significant using AND gates 707. The results from all of the AND gates 707 are then subjected to another AND gate 709 which compares the results. If the result from AND gate 709 is true, then the contents of the data element positions are sequential. If not, then the contents of the data element positions are not sequential. The result of the second ANDing is stored in the destination as described with respect to FIG. 6. Of course, variations may be used such as using subtraction instead of addition, using NAND logic instead of AND, etc.

Exemplary Format of VPISSEQUENTIAL

An exemplary format of this instruction is "VPISSEQUENTIAL {K1} R1, R2" where the destination operand K1 is an optional writemask register, R1 is a packed data source register, and R2 is a packed data destination register (such as 128-, 256-, 512-bit register, etc.) and VPISUNIFORMD is the instruction's opcode. As noted earlier, the instruction will also work with memory locations, not just registers. Additionally, in some embodiments the destination is a general purpose register.

Exemplary Methods of Execution of VPISSEQUENTIAL

Figure 8:
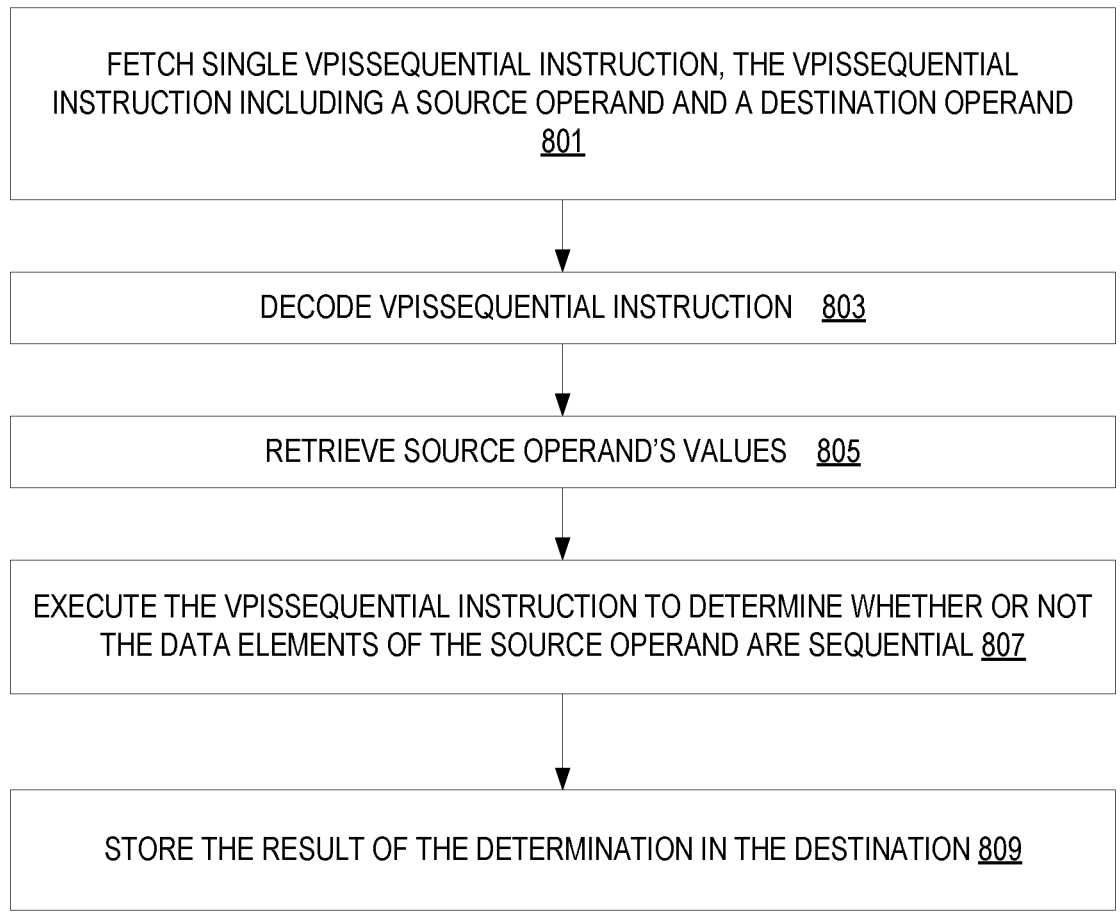
FIG. 8 illustrates an embodiment of the execution of a VPISSEQUENTIAL instruction in a processor.

FIG. 8 illustrates an embodiment of the execution of a VPISSEQUENTIAL instruction in a processor. A VPISSEQUENTIAL instruction with a source operand, a destination operand, and an opcode is fetched at 801. The VPISUNIFORMD instruction is decoded by decoding logic at 803. Depending on the instruction's format, a variety of data may be interpreted at this stage such as if there is to be a data transformation, which registers to write to and/or retrieve, what memory address to access, etc.

The source operand values are retrieved/read at 805. For example, the source vector register is read. If the source operand is a memory operand, then the data elements associated with that operand is retrieved. In some embodiments, data elements from memory are stored into a temporary register.

The VPISSEQUENTIAL instruction (or operations comprising such an instruction such as microoperations) is executed by execution resources such as one or more functional units at 807 to determine whether or not data elements of consecutive data element positions of the source operand are sequential.

An indication of the result of the determination is stored in a destination location at 809. As noted above, in some embodiments, each data element position of the destination location has the indication stored. For example, all 1s may be written in each data element position of the destination if the determination is true or all 0s if false. While 807 and 809 have been illustrated separately, in some embodiments they are performed together as a part of the execution of the instruction.

Figure 9:
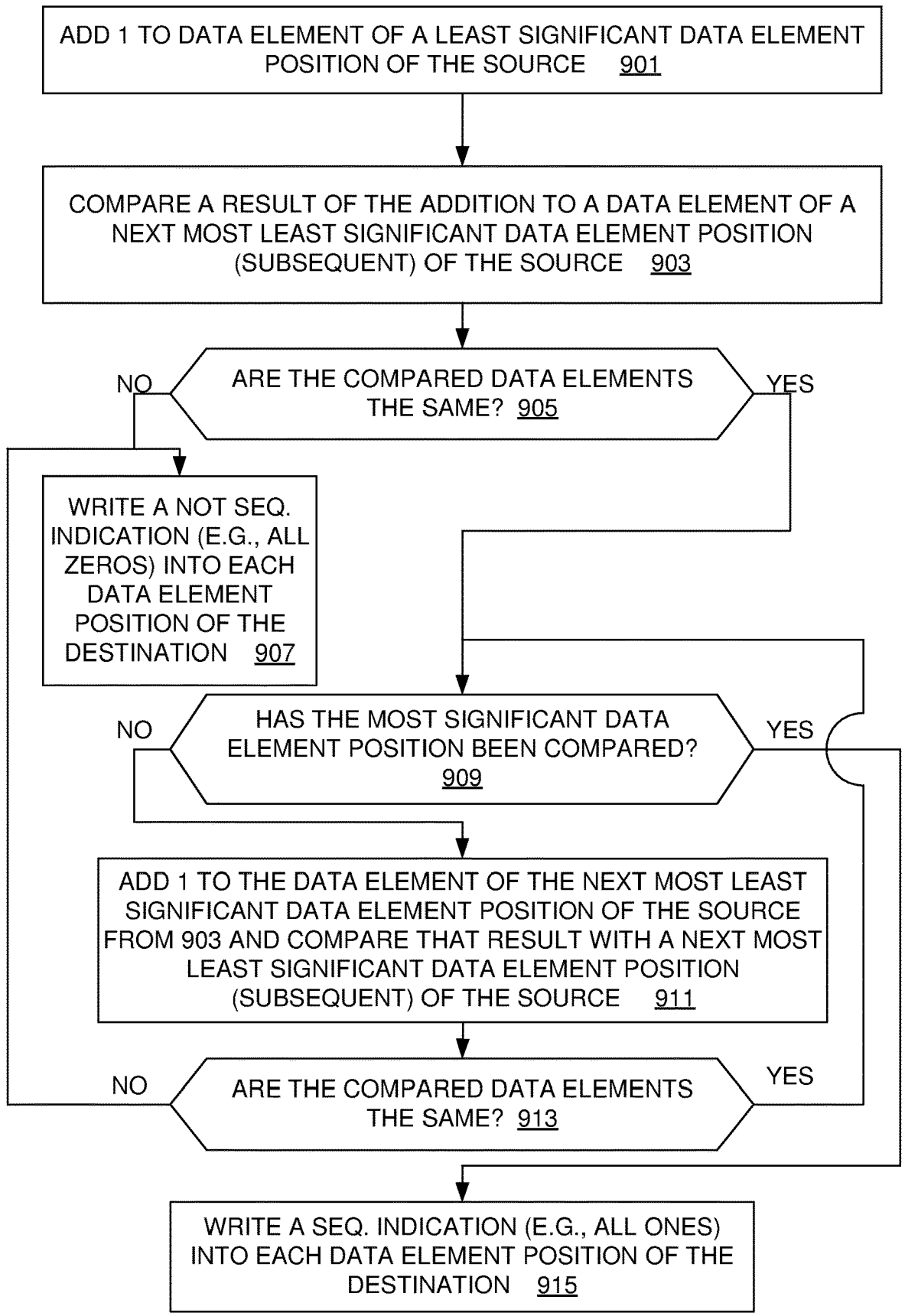
FIG. 9 illustrates an embodiment of a method for processing a VPISSEQUENTIAL instruction.

FIG. 9 illustrates an embodiment of a method for processing a VPISSEQUENTIAL instruction. In this embodiment it is assumed that some, if not all, of the operations 801-805 have been performed earlier, however, they are not shown in order to not obscure the details presented below. For example, the fetching and decoding are not shown, nor is the operand retrieval shown.

At 901, a 1 is added to a data element of a least significant data element position of the source. At 903, a result of the addition of 901 is compared to a data element of a next most least significant data element position of the source. For example, a data element of data element position 0 (the least significant data element position) that has had 1 added to it is compared to a data element of data element position 1 (the next least significant data element position).

A determination of if the compared data elements are the same is made at 905. If not, then an indication of this is written into each data element position of the destination at 907. For example, all 0s are written into each data element position of the destination.

If yes, then a determination may be made at 909 of if the most significant data element position of the source has been subject to a comparison is made. This step may not be performed after the two most least significant data element positions have been compared.

If this step is not performed, or if the determination is a no, then a 1 is added to the data element of the next most least significant data element position of the source from 903 and that is compared to a next least significant data element (subsequent) position of the source at 911. For example, a data element of data element position 1 (the significant data element position) plus 1 is compared to a data element of data element position 2 (the subsequently next least significant data element position).

After the comparison 911, a determination is made at 913 of if the compared data elements are the same is made. If the data elements are not the same, then an indication of this is written into each data element position of the destination. For example, all 0s are written into each data element position of the destination at 907. If the data elements are the same, then the determination of 909 is performed.

After the most significant data element position has been compared and was found to be the same as what is was compared to, then a sequential indication (e.g., all 1s) is written into each data element position of the destination at 915. While the above as been described as starting with the least significant data element position, any variant of the order may be used.

FIG. 10 illustrates exemplary pseudo code for VPISSEQUENTIAL.

Exemplary Register Architecture

Figure 12:
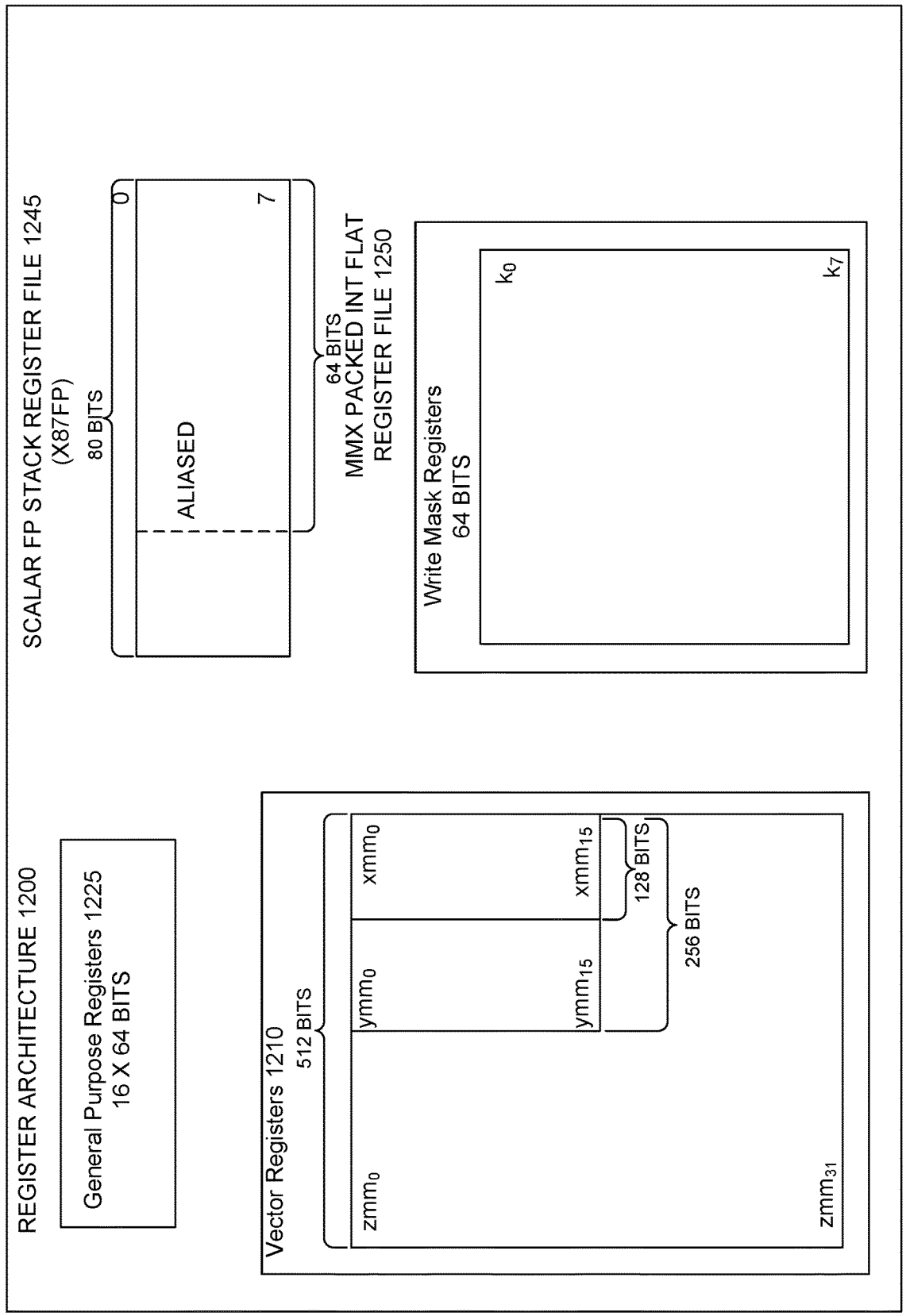
FIG. 12 is a block diagram of a register architecture 1200 according to one embodiment of the invention.

FIG. 12 is a block diagram of a register architecture 1200 according to one embodiment of the invention. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and out-of-order core block diagram

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file unit(s) 1358. Each of the physical register file unit(s) 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 1358 comprises a vector registers unit and a scalar registers unit. These register units may provide architectural vector registers, vector mask registers, and general purpose registers. The physical register file unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file unit(s) 1358 and the memory unit 1370 perform the register read/memory read stage 1314; the execution cluster 1360 perform the execute stage 1316; 6) the memory unit 1370 and the physical register file unit(s) 1358 perform the write back/memory write stage 1318; 7) various units may be involved in the exception handling stage 1322; and 8) the retirement unit 1354 and the physical register file unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 14B:
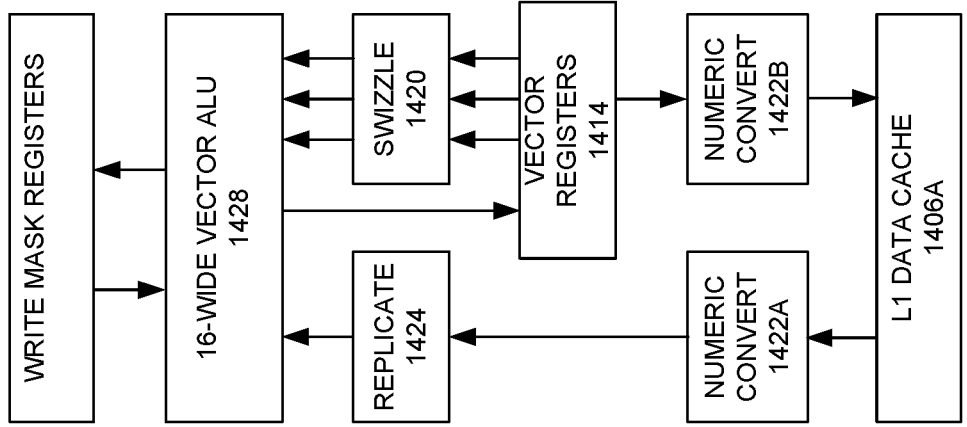
FIGS. 14A-B illustrate a block diagram of a more specific exemplary in-order core architecture, which core would be one of several logic blocks (including other cores of the same type and/or different types) in a chip.
Figure 14A:
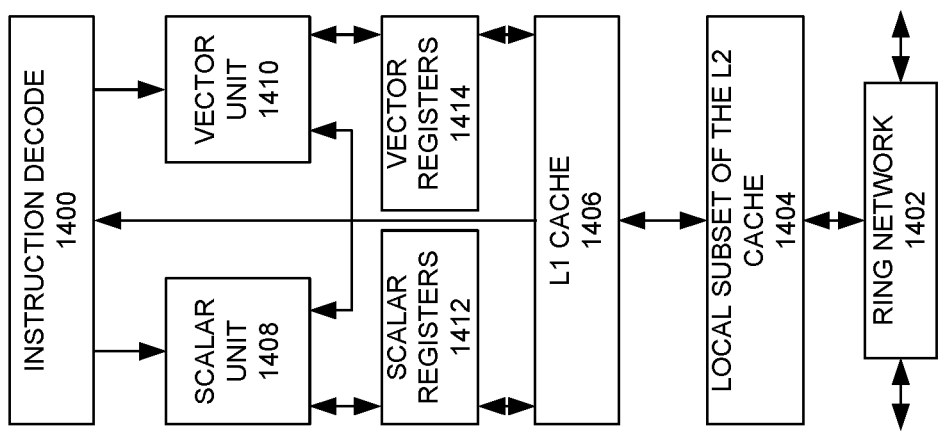

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input.

Processor with Integrated Memory Controller and Graphics

Figure 15:
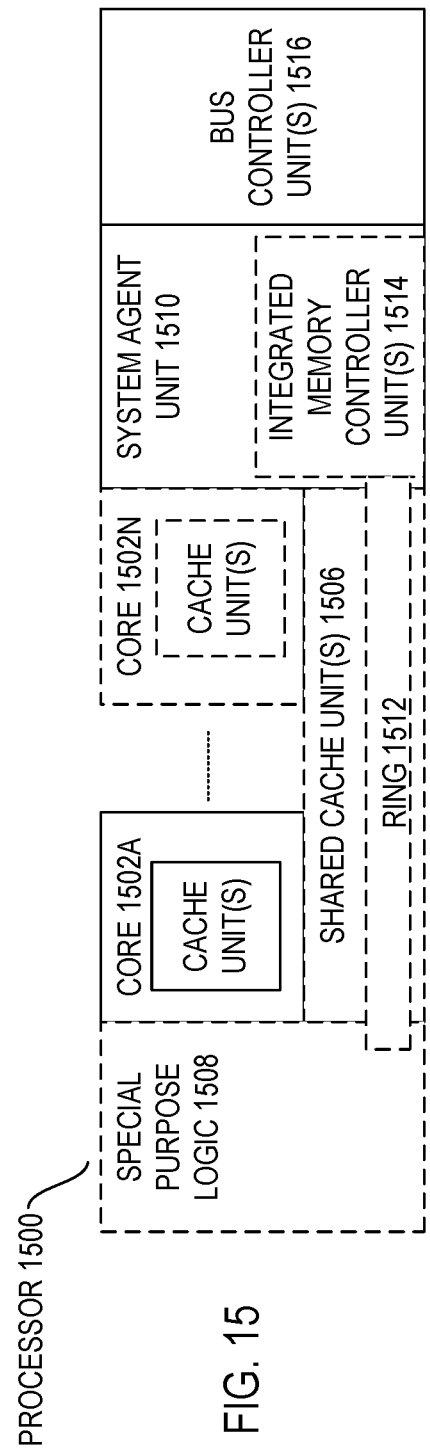
FIG. 15 is a block diagram of a processor 1500 that may have more than one core, may have an integrated memory controller, and may have integrated graphics according to embodiments of the invention.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
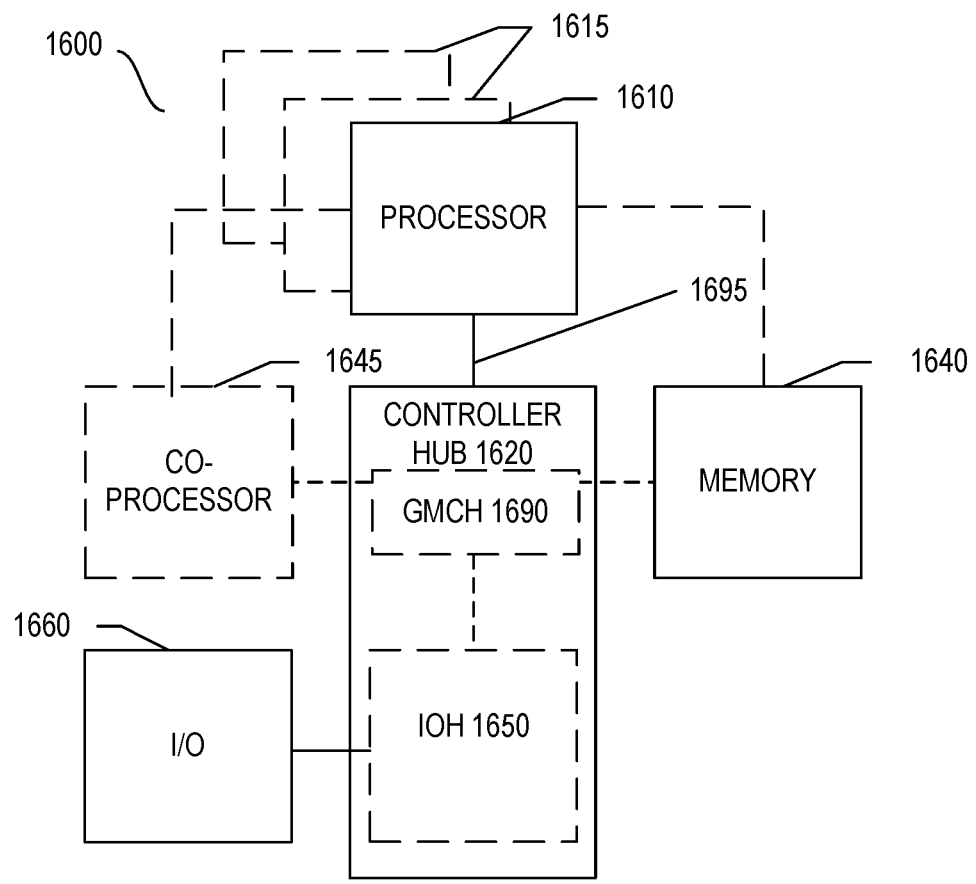
FIGS. 16-19 are block diagrams of exemplary computer architectures.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
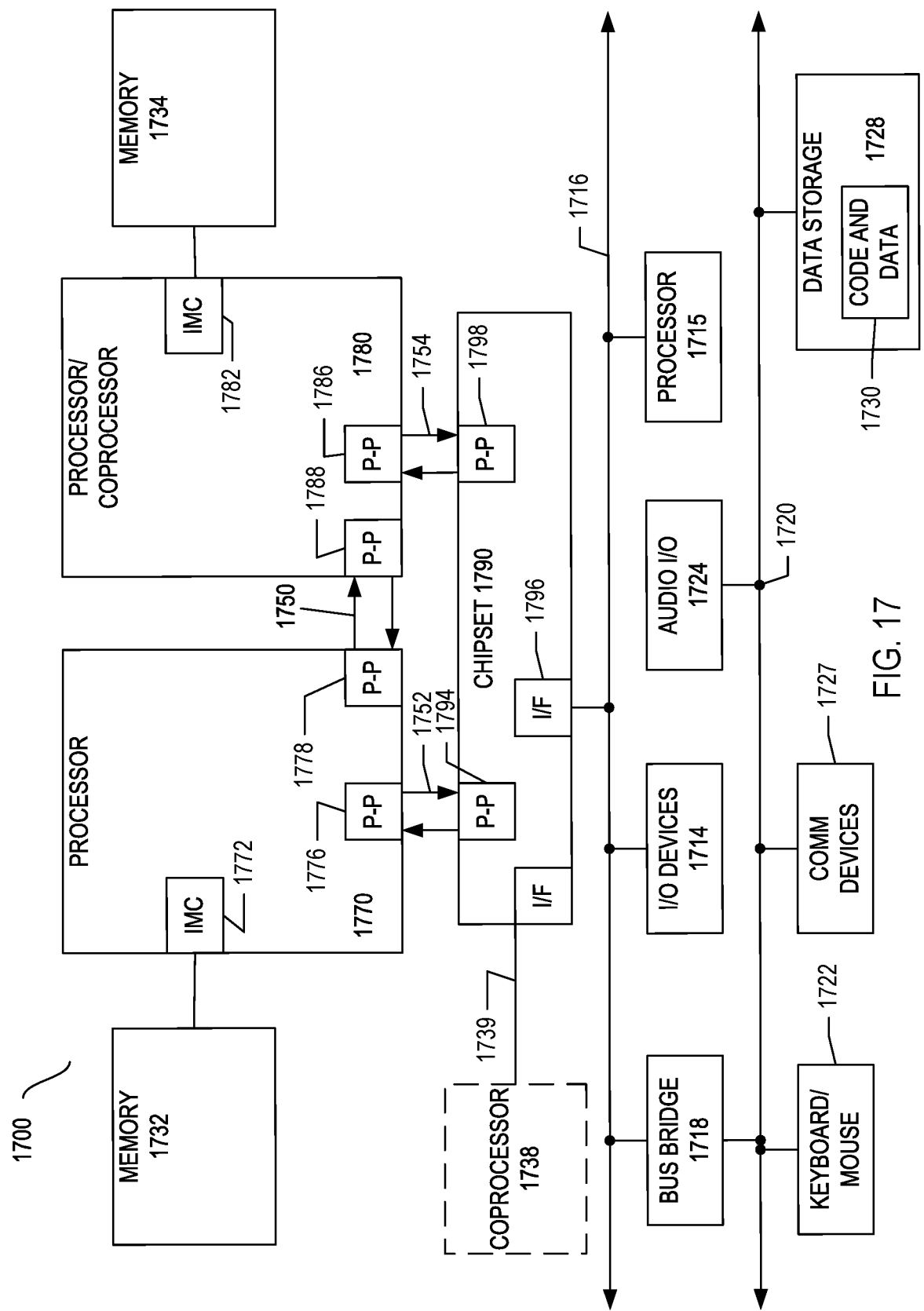

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
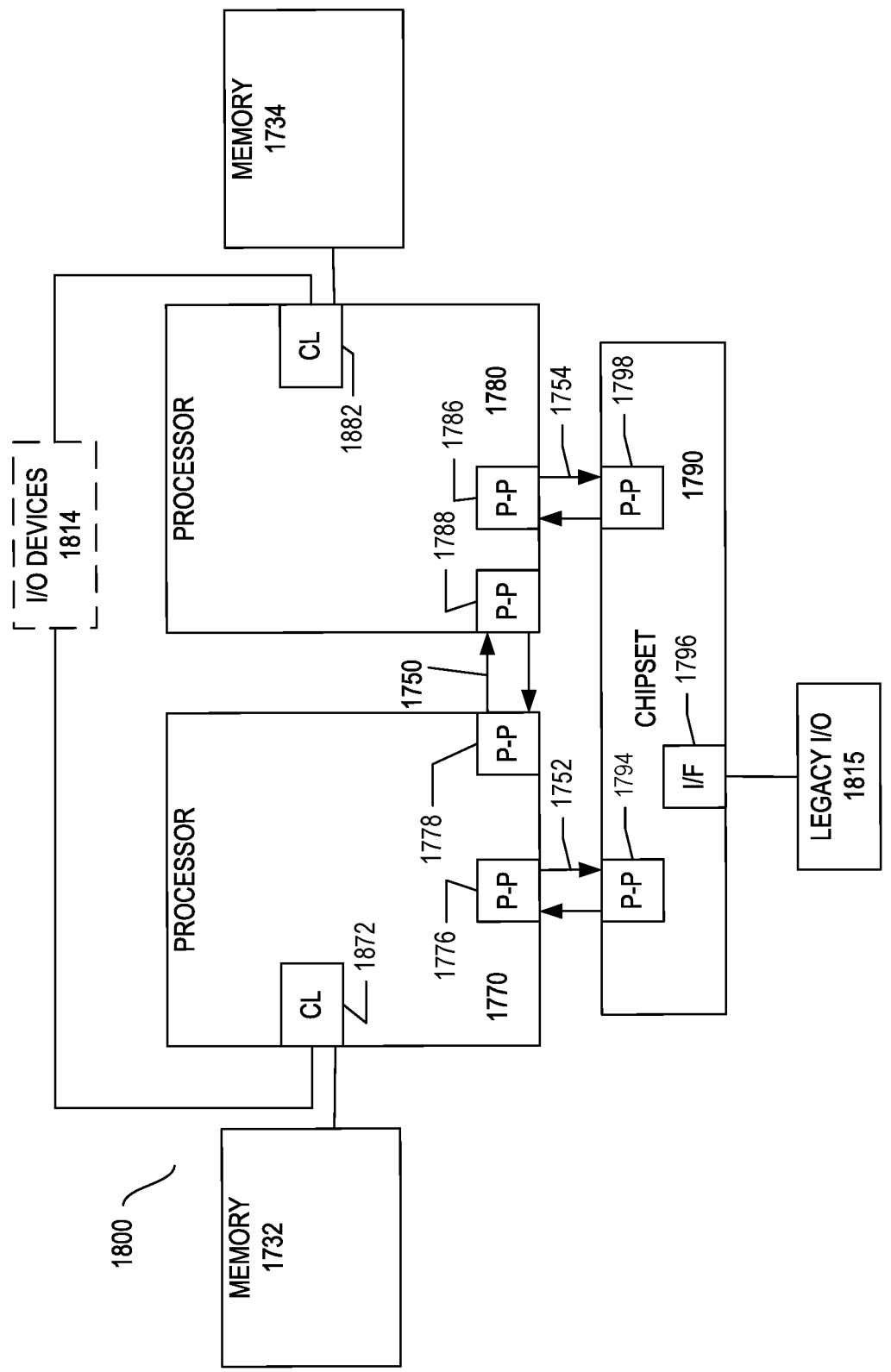

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1872 and 1882, respectively. Thus, the CL 1872, 1882 include integrated memory controller units and include I/O control logic. FIG. 18 illustrates that not only are the memories 1732, 1734 coupled to the CL 1872, 1882, but also that I/O devices 1814 are also coupled to the control logic 1872, 1882. Legacy I/O devices 1815 are coupled to the chipset 1790.

Figure 19:
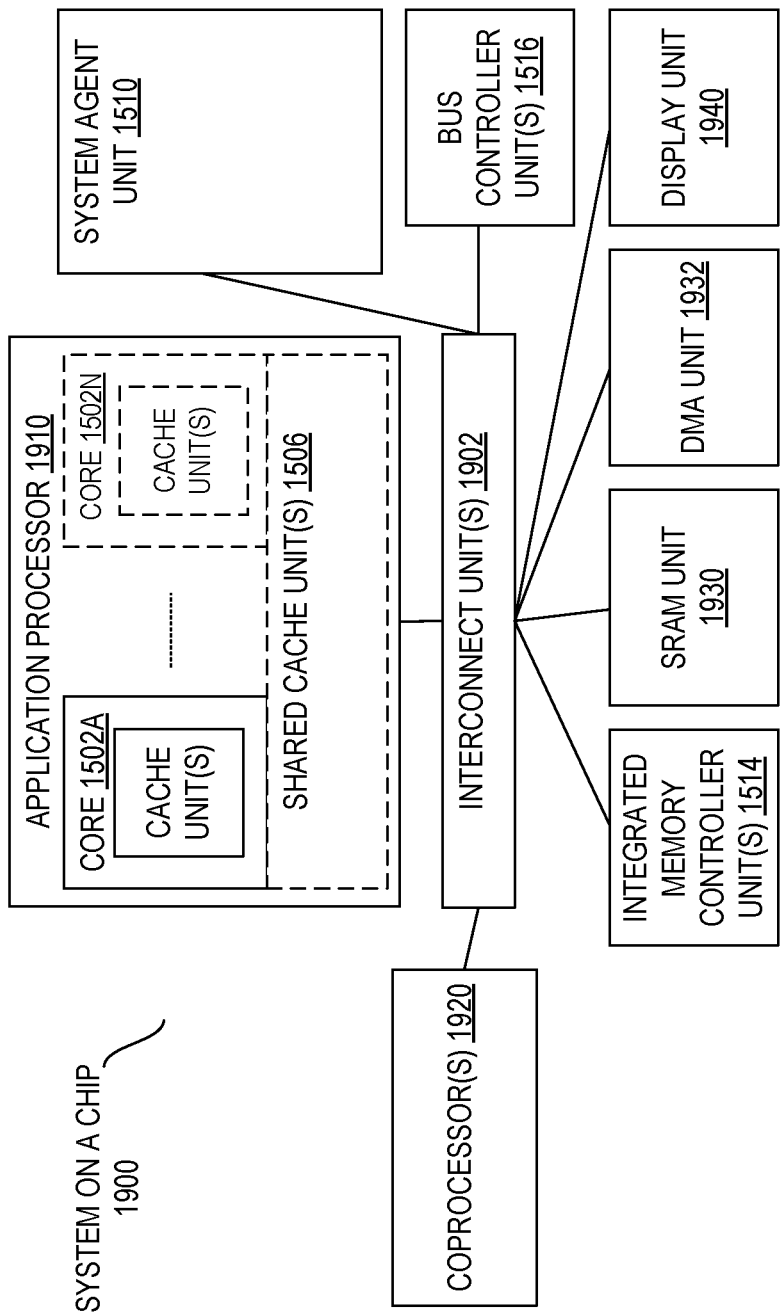

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 202A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

What is claimed is:

1. A method of performing, in a computer processor, an instruction, the instruction including a source operand, a destination operand, and an opcode, the method comprising:
   decoding the instruction; and
   executing the decoded instruction to determine whether or not all data elements of the source operand are equal and store a first indication into the destination operand whenever all of the data elements of the source operand are equal and a second indication into the destination operand whenever all data elements of the source operand are not equal, wherein the first indication is all bits set to one and the second indication is all bits set to zero.

2. The method of claim 1, wherein the source and destination operands are packed data registers.

3. The method of claim 2, wherein the packed data registers are of size 128-bit, 256-bit, or 512-bit.

4. The method of claim 1, wherein the source operand is a memory location and the destination operand is a packed data register.

5. The method of claim 1, wherein the first indication is stored in each data element position of the destination operand.

6. The method of claim 1, wherein the destination operand is a general purpose register.

7. An apparatus comprising:
a decoder to decode an instruction, the instruction including a source and a destination operand; and
execution circuitry to execute the decoded instruction to determine whether all data elements of the source operand are equal and store a first indication into the destination operand whenever all of the data elements of the source operand are equal and a second indication into the destination operand whenever all data elements of the source operand are not equal, wherein the first indication is all bits set to one and the second indication is all bits set to zero.

8. The apparatus of claim 7, wherein the source and destination operands are packed data registers.

9. The apparatus of claim 8, wherein the packed data registers are of size 128-bit, 256-bit, or 512-bit.

10. The apparatus of claim 7, wherein the source operand is a memory location and the destination operand is a packed data register.

11. The apparatus of claim 7, wherein the first indication is stored in each data element position of the destination operand.

12. The apparatus of claim 7, wherein the destination operand is a general purpose register.

13. A non-transitory machine-readable medium storing an instruction, which when encountered by a processor, causes the processor to:

decode the instruction, the instruction including a source operand and a destination operand; and
execute the decoded instruction to determine whether or not all data elements of the source operand are equal and store a first indication into the destination operand whenever all of the data elements of the source operand are equal and a second indication into the destination operand whenever all data elements of the source operand are not equal, wherein the first indication is all bits set to one and the second indication is all bits set to zero.

14. The non-transitory machine-readable medium of claim 13, wherein the source and destination operands are packed data registers.

15. The non-transitory machine-readable medium of claim 14, wherein the packed data registers are of size 128-bit, 256-bit, or 512-bit.

16. The non-transitory machine-readable medium of claim 13, wherein the source operand is a memory location and the destination operand is a packed data register.

17. The non-transitory machine-readable medium of claim 13, wherein the first indication is stored in each data element position of the destination operand.

18. The non-transitory machine-readable medium of claim 13, wherein the destination operand is a general purpose register.

* * * * *